United States Patent
Chamberlin et al.

(10) Patent No.: US 7,797,753 B2
(45) Date of Patent: Sep. 14, 2010

(54) DEVICE DRIVER SETTING PROFILE LOCK-DOWN

(75) Inventors: David Chamberlin, Oakland, CA (US); Hans-Gerd Gersch, Rheinberg (DE)

(73) Assignees: Kyocera Mita Corporation, Osaka-shi (JP); Kyocera Technology Development, Inc., Concord, CA (US)

( * ) Notice: Subject to any disclaimer, the term of this patent is extended or adjusted under 35 U.S.C. 154(b) by 1094 days.

(21) Appl. No.: 11/149,784

(22) Filed: Jun. 9, 2005

(65) Prior Publication Data

US 2006/0282772 A1 Dec. 14, 2006

(51) Int. Cl.
*G06F 17/00* (2006.01)
*G06F 17/30* (2006.01)

(52) U.S. Cl. .............................. 726/28; 726/21; 726/27

(58) Field of Classification Search ................... 726/21, 726/28, 27
See application file for complete search history.

(56) References Cited

U.S. PATENT DOCUMENTS

| | | | |
|---|---|---|---|
| 5,604,860 A | 2/1997 | McLaughlin | |
| 6,021,496 A * | 2/2000 | Dutcher et al. | 726/21 |
| 6,121,968 A | 9/2000 | Arcuri | |
| 6,407,760 B1 | 6/2002 | Aritomi | |
| 6,515,684 B1 | 2/2003 | Knodt | |
| 6,535,229 B1 | 3/2003 | Kraft | |
| 6,574,002 B1 | 6/2003 | Paczewitz | |
| 6,614,454 B1 | 9/2003 | Livingston | |
| 6,621,532 B1 | 9/2003 | Mandt | |
| 6,625,503 B1 | 9/2003 | Smith | |
| 6,661,437 B1 | 12/2003 | Miller | |
| 6,684,260 B1 | 1/2004 | Foster | |
| 2001/0002128 A1 | 5/2001 | Takayama | |
| 2001/0006423 A1 | 7/2001 | Subramaniam | |
| 2002/0035941 A1 | 3/2002 | Nakao | |
| 2002/0047866 A1 | 4/2002 | Matsumoto | |
| 2002/0054146 A1 | 5/2002 | Fukumoto | |
| 2002/0070977 A1 | 6/2002 | Morcos | |

(Continued)

FOREIGN PATENT DOCUMENTS

JP 2001043050 2/2001

(Continued)

OTHER PUBLICATIONS

Actividentity, Solutions for Sun, Smart Employee ID with Sun Java System Identity Manager; printed out in year 2008.*

(Continued)

*Primary Examiner*—David Y Jung (57) ABSTRACT

A method for providing a menu for a device, by providing a GUI for an administrator to select and lock-down device driver setting profiles, and providing a GUI for displaying to a user the locked-down profiles and permitting the user to select only from the listed profiles. Allowing a user to choose only from the pre-defined profiles makes for convenience and avoids waste from setting errors by novice users. The computer system detects the current system and job information (time, date, printer status, application, user information, etc.) using WMI and SNMP, applies mapping rules defined by an administrator, and displays only those profiles that are applicable to the current system and job status. Methods also include defining new profiles; alerting the user when no profiles are available, with mapping explanation and suggestion; profile detail display; and printer support.

20 Claims, 8 Drawing Sheets

U.S. PATENT DOCUMENTS

| | | |
|---|---|---|
| 2003/0020760 A1 | 1/2003 | Takatsu |
| 2003/0035012 A1 | 2/2003 | Kurtenbach |
| 2003/0043208 A1 | 3/2003 | Staelin |
| 2003/0048309 A1 | 3/2003 | Tambata |
| 2003/0081008 A1 | 5/2003 | Seo |
| 2003/0088793 A1 | 5/2003 | Parry |
| 2003/0169299 A1 | 9/2003 | Kusano |
| 2003/0169300 A1 | 9/2003 | Colgrove |
| 2003/0174177 A1 | 9/2003 | Tsukuda |
| 2003/0184781 A1 | 10/2003 | Laughlin |
| 2004/0120747 A1 | 6/2004 | Okochi |

FOREIGN PATENT DOCUMENTS

| | | |
|---|---|---|
| JP | 2004192219 | 7/2004 |

OTHER PUBLICATIONS

Communicating requirements using end-user GUI constructions with argumentation; Moore, J.M.; Automated Software Engineering, 2003. Proceedings. 18th IEEE International Conference on Oct. 6-10, 2003 pp. 360-363; year 2003.*

Novell NetWare 6.5 Administrator's Handbook, Jeffrey L. Harris, Introduction to NetWare Printing; Copyright © 2004; year 2004.*

Novell NetWare 6.5 Administrator's Handbook, Jeffrey L. Harris, Setting Up a Secure Printing; Copyright © 2004; year 2004.*

Novell NetWare 6.5 Administrator's Handbook, Jeffrey L. Harris; Chapter 7. NetWare Printing Services, Instant Access; Copyright © 2004; year 2004.*

Zero Internet administration approach: the case of DNS ; Cheng Soon Giap; Kadobayashi, Y.; Yamaguchi, S.; Information Networking, 1998. (ICOIN-12) Proceedings., Twelfth International Conference on; Publication Year: 1998 , pp. 350-355.*

Enterprise model as a basis of administration on role-based access control; Sejong Oh; Seog Park; Cooperative Database Systems for Advanced Applications, 2001. CODAS 2001. The Proceedings of the Third International Symposium on; Publication Year: 2001 , pp. 150-158.*

Proposal for Modifications to the OSCAR Architecture to Address Challenges in Distributed System Management ; Vallee, G.; Naughton, T.; Scott, S.L.; High Performance Computing Systems and Applications, 2008. HPCS 2008. 22nd International Symposium on; Publication Year: 2008 , pp. 40-46.*

U.S. Appl. No. 10/805,469, filed Sep. 22, 2005, Baranda.

U.S. Appl. No. 10/972,262, filed Apr. 27, 2006, Tanaka.

* cited by examiner

DEVICE DRIVER SETTING PROFILE LOCK-DOWN

CROSS-REFERENCES TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to the field of graphical user interfaces (GUI) for device drivers, and more particularly to providing methods for locking-down and displaying device driver setting profiles.

BACKGROUND OF THE INVENTION

Device drivers are generally known, including a printer driver. Typically, printing from a computer occurs through the use of a printer driver. Upon either an application launch or during a print command load time, the application will call an instance of the printer driver. As devices become more complex and the number of settings increases, selecting the correct settings becomes a more complicated task. A novice user is especially likely to make device setting errors, causing waste of resources. The present invention arose out of the above concerns associated with providing an improved GUI (graphical user interface) for device drivers.

SUMMARY OF THE INVENTION

Methods, computer program products, computing and printing systems for locking-down and displaying device driver setting profiles are described. The present invention provides a GUI for an administrator to select and lock-down device driver setting profiles, and a GUI for displaying to a user the locked-down profiles and permitting the user to select only from the listed profiles. A profile (device driver setting profile) is a customizable collection or set of setting values, optionally associated with a mnemonic name and icon. Allowing a user to choose only from the pre-defined profiles makes for convenience and avoids waste from setting errors by novice users. The computer system detects the current system and job information (time, date, printer status, application, user information, etc.) using WMI and SNMP, applies mapping rules defined by an administrator, and displays only those profiles that are applicable to the current system and job status.

As the number of settings for a device increases, it becomes more and more cumbersome to change settings and to confirm that the correct settings are currently in effect. A goal of the present invention is to simplify this process by allowing the user to conveniently choose from a set of profiles, where a profile is a set of pre-defined device setting values. In an embodiment of the present invention, this process is further simplified by letting the computer system detect the current system and job information, and according to the pre-defined mapping rules, presenting the user with only a subset of profiles that are applicable to the current system and job status. For example, the applicable set of profiles may depend on the user, application name (word processor or Internet browser, etc.), and the number of pages in the print job.

Manually changing or selecting setting values may be especially difficult for a novice user, such as a part-time employee of a large organization. Another benefit of the present invention is that making the profiles to be locked-down and allowing a user to choose only from the presented profiles avoids setting errors by a novice user. In an embodiment of the present invention, a user belonging to a certain user group will be allowed to choose only from certain profiles. This avoids wasting of expensive paper (costly media type such as glossy paper), ink, toner, and other resources caused by setting errors by a novice user.

An embodiment of the invention provides a menu for a device, comprising a GUI for an administrator to select and lock-down device driver setting profiles, and a GUI for displaying to a user the locked-down profiles and permitting the user to select only from the locked-down profiles.

In a further embodiment of the invention, the GUI for an administrator to select and lock-down profiles further comprises a method for defining new profiles: a GUI for the administrator to define a profile comprising: selecting at least one setting value, specifying a profile name and icon, and registering the at least one setting value as a profile.

In a further embodiment of the invention, an association (or a mapping) can be defined by an administrator, so that only a subset of the profiles is presented in a given situation (system and job information). The GUI for an administrator to select and lock-down profiles further comprises a GUI for the administrator to define a mapping from system and job information to the profiles. The GUI for displaying to the user the locked-down profiles and permitting the user to select only from the locked-down profiles comprises obtaining current system and job information, and displaying to the user the locked-down profiles resulting from applying the mapping from system and job information to the profiles to the current system and job information. Examples of system and job information are time and date information, device status information, application information, and user information. Obtaining the current system and job information may involve obtaining local information by WMI and remote information by SNMP.

In a further embodiment of the invention, a user is specially alerted when there are no profiles to choose from. Displaying to the user the locked-down profiles (resulting from applying the mapping from system and job information to the profiles to the current system and job information) comprises: alerting the user when zero profiles result from applying the mapping, and displaying explanation of the mapping and suggestion.

In a further embodiment of the invention, the GUI provides explanatory details of the profiles, wherein the GUI for displaying to a user the locked-down profiles and permitting the user to select only from the locked-down profiles further comprises a GUI for selecting a profile and displaying profile detail information in a separate display window.

In a further embodiment of the invention, the device driver setting profiles are for a printing device. In this case, driver settings include paper type, duplex printing, N-up settings, etc.

The invention will be more fully understood upon consideration of the detailed description below, taken together with the accompanying drawings.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
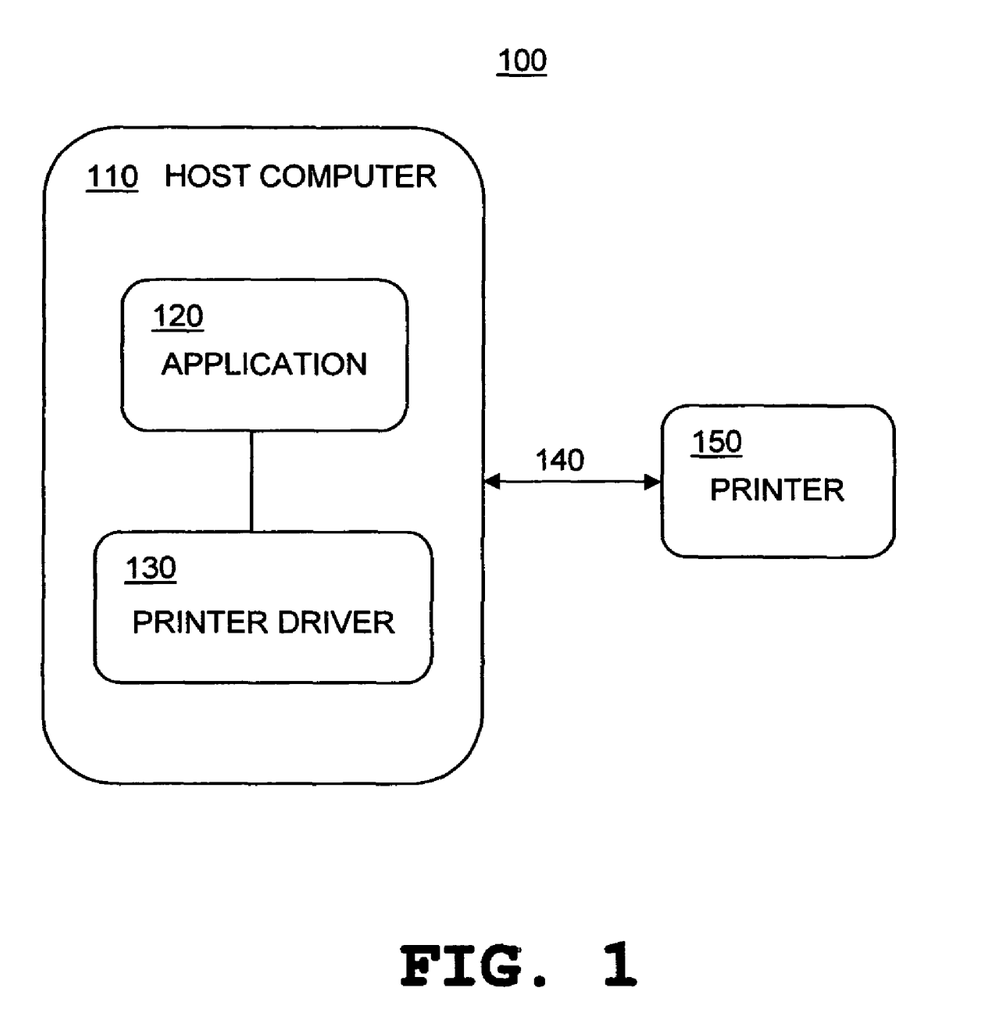
FIG. 1 is a simplified block diagram showing connection of a computing system to a printer.

FIG. 1 shows a general printing system setup 100 that includes a host computer 110 and a printer 150. Here, the printer 150 may be any device that can-act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer driver settings, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver settings, but they are to be understood as similarly applicable to other kinds of device drivers.

Figure 2:
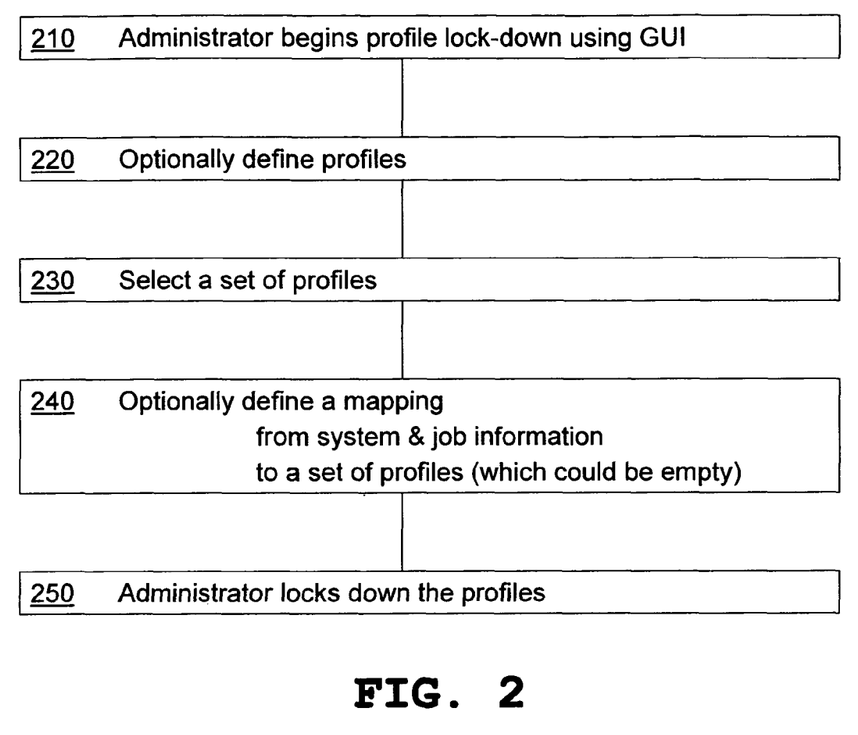
FIG. 2 is a flowchart showing the overall profile lock-down procedure by an administrator, in accordance with a preferred embodiment of the present invention.

FIG. 2 is a flowchart showing the overall profile lock-down procedure by an administrator, in accordance with a preferred embodiment of the present invention.

In step 210, the administrator begins profile lock-down using GUI. This can be initiated while the user is already logged on in an administrator status. Otherwise, the administrator would certify the administrator status in step 250. Profile lock-down can be started from a menu in the GUI. In an embodiment of the invention, this is entered from the "Device Settings" tab of a particular printer within the "Printers and Faxes" menu.

In step 220, a new profile is defined. This step is optional and described further in a later figure.

In step 230, a set of profiles is selected. Typically, a list of all available profiles is displayed and the desired profiles are selected from the list. The selected set may include exactly one profile. As described later, the set of profiles selected may consist of zero profiles.

In step 240, the administrator defines a set of mappings from application and context to a set of profiles. This step is optional and described further in a later figure.

In step 250, the administrator locks down the profiles. To lock down the profiles means that user attempting to print will be confined to selection only from these profiles, and that the profiles thus registered can only be changed by another administrator operation. If the administrator is not already logged on using an administrator status, it is at this time that the administrator certifies the administrator status by typing in a password, etc. to verify privilege to execute this administrative operation. In an embodiment of the invention, locking-down is achieved by the administrator placing a check mark in the checkbox labeled "Lock these settings" or "Lock down these profiles" and entering the administrator password. Unlocking or changing the locked-down profiles follows a similar procedure.

Figure 3:
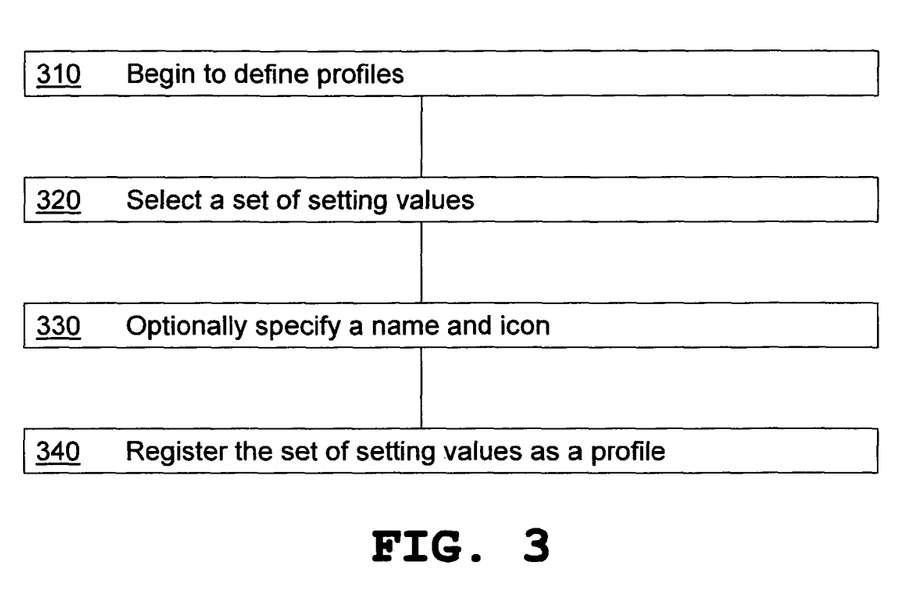
FIG. 3 is a flowchart showing the procedure of defining a profile, in accordance with a preferred embodiment of the present invention.

FIG. 3 is a flowchart showing the procedure of defining a profile, in accordance with a preferred embodiment of the present invention.

In step 310, the user begins definition of a new profile. The procedure of defining a new profile is the same for administrators and other users. That is, defining a new profile per se is not a privileged procedure, and an ordinary user is typically given the ability to define a profile for convenience.

In step 320, a set of setting values are selected. An example of a set of setting values in a profile is as follows: No duplex, 2-Up, Print text as black, while all the other settings are the same as the factory default.

In step 330, optionally a name and icon are specified for the new profile. If a new name is not selected by the user, an automatically-generated name such as "Profile3" can be assigned to the new profile. An icon can be selected and assigned to the new profile for easy recognition.

In step 340, the set of selected setting values is registered as a profile, along with the optional name and icon. This step is typically accomplished by clicking on an OK or Register button.

Figure 4:
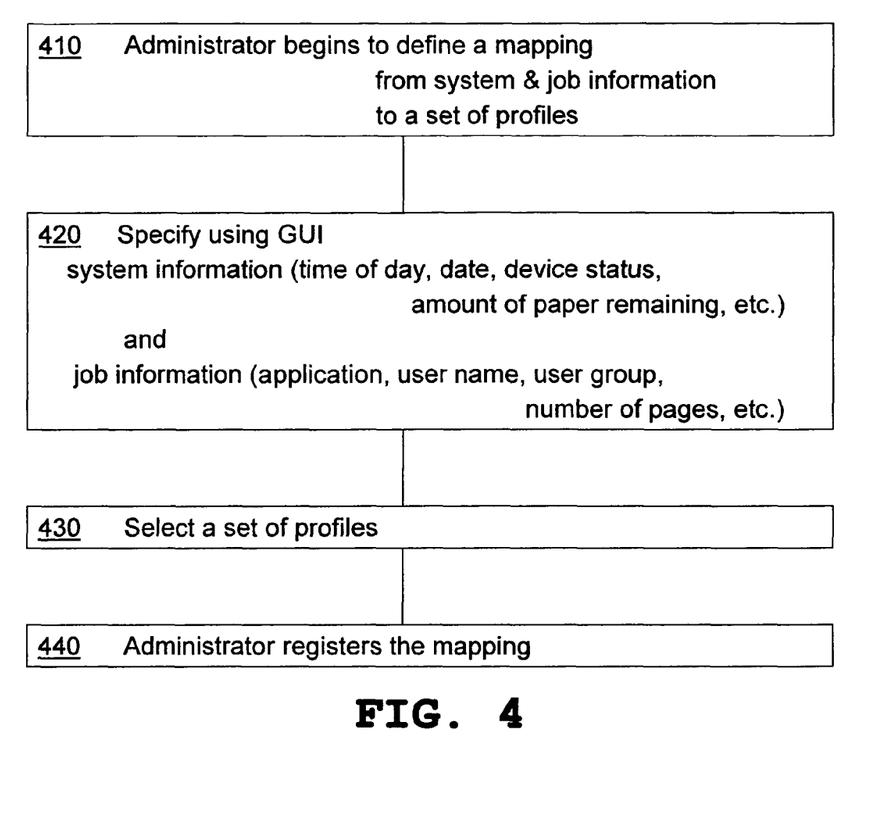
FIG. 4 is a flowchart showing the procedure of defining a mapping from system and job information to a set of profiles, in accordance with a preferred embodiment of the present invention.

FIG. 4 is a flowchart showing the procedure of defining a mapping from system and job information to a set of profiles, in accordance with a preferred embodiment of the present invention.

In step 410, the administrator begins to define a mapping from system and job information to a set of profiles. This is a part of the options in the overall process of locking down profiles.

In step 420, using GUI the administrator specifies the applicable system information and job information. Examples of system and job information are time and date information, device status information, application information, and user information. Typical system information items are time of day, amount of paper remaining in the printer, etc. Typical job information items are application type and name, user name, user group, number of pages in the job, etc.

In step 430, a set of profiles is selected. This step is similar to step 230. Typically, a list of all available profiles is displayed and the desired profiles are selected from the list. The selected set may include exactly one profile. As described later, the set of profiles selected may consist of zero profiles.

In step 440, the administrator registers the mapping specified above. Typically, this is done by clicking on a Register or OK button. If this step is the final step in the overall lock-down process, this step may involve administrator certification using a password, similarly to step 250.

Figure 5:
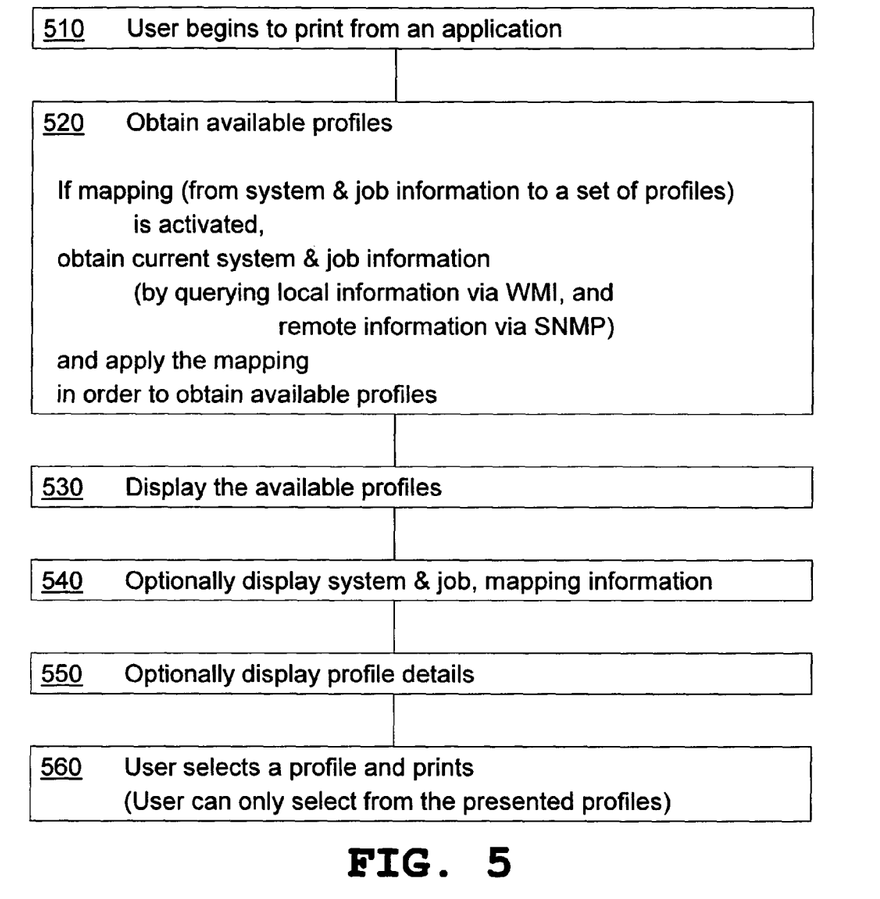
FIG. 5 is a flowchart showing the procedure while a user prints from an application, in accordance with a preferred embodiment of the present invention.

FIG. 5 is a flowchart showing the procedure while a user prints from an application, in accordance with a preferred embodiment of the present invention. In step 510, the user begins to print from an application, by initiating printing by clicking on the Print icon, from the Print menu or by another interface provided for by the application.

In step 520, a set of applicable available profiles is obtained. If mapping from system and job information to a set of profiles is enabled and activated, then current system and job information is obtained by querying local information via WMI (Windows Management Instrumentation) and remote information via SNMP (Simple Network Management Protocol). This information is then used to apply the mapping rules to obtain the set of profiles available for the current system and job information. In an embodiment of the present invention, application of the mapping rules occurs by testing a sequence of conditionals. If the current system and job information satisfies the conditions of the first mapping rule, then that mapping rule is applied. Otherwise, if the current system and job information satisfies the conditions of the second mapping rule, then that mapping rule is applied, and so on.

In step 530, the set of available profiles is displayed. In an embodiment of the present invention, this can be a simple textual list. In other embodiments of the present invention, this display may employ graphical interfaces, described below.

In step 540, the current and applicable system and job information, as well as, the relevant mapping rules are optionally displayed in addition to the set of available profiles.

In step 550, details of the available profiles are optionally displayed. In an embodiment of the present invention, this can be a simple textual list of the profile details. In other embodiments of the present invention, this display may employ graphical interfaces involving more user-friendly layouts, described below.

In step 560, the user selects a profile from the list of available profiles, and initiates printing. There may be a default profile selection presented by the system, which can be accepted or the user, or otherwise the user selects another profile choice by a mouse click or other means.

Figure 6:
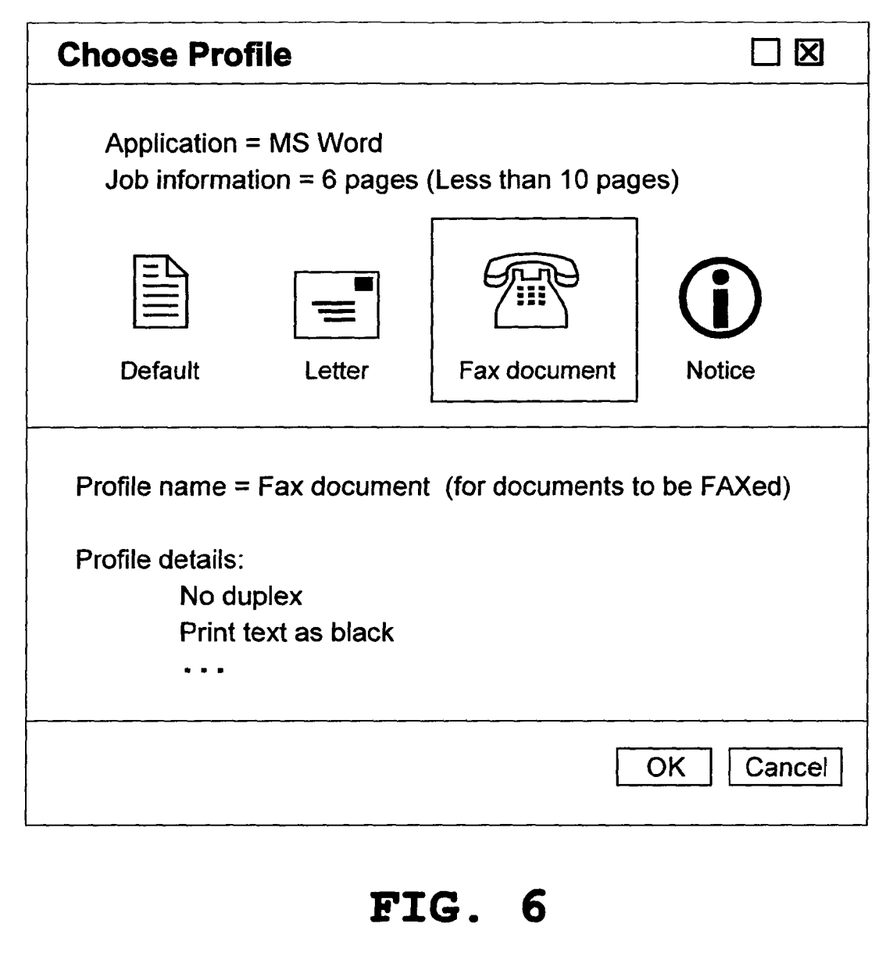
FIG. 6 is a view of the GUI for selecting a profile and displaying profile details, in accordance with a preferred embodiment of the present invention.

FIG. 6 is a view of the GUI for selecting a profile and displaying profile details, in accordance with a preferred embodiment of the present invention.

The GUI is divided into an upper section and a lower section. In the upper section the list of available profiles is displayed using icons accompanying the names of the profiles. The icon for the profile "Fax document" is highlighted to show that it is currently selected. In the upper section some system and job information is optionally displayed. FIG. 6 shows the current application name and the job information that the document being printed is less than 10 pages long.

In the lower section of the GUI the details of the selected profile is displayed. The profile name "Fax document" is accompanied by a brief description "(for documents to be FAXed)" which was optionally supplied to the defined profile. In addition, the detailed setting values of the profile are displayed: No duplex, Print text as black, etc.

Figure 7:
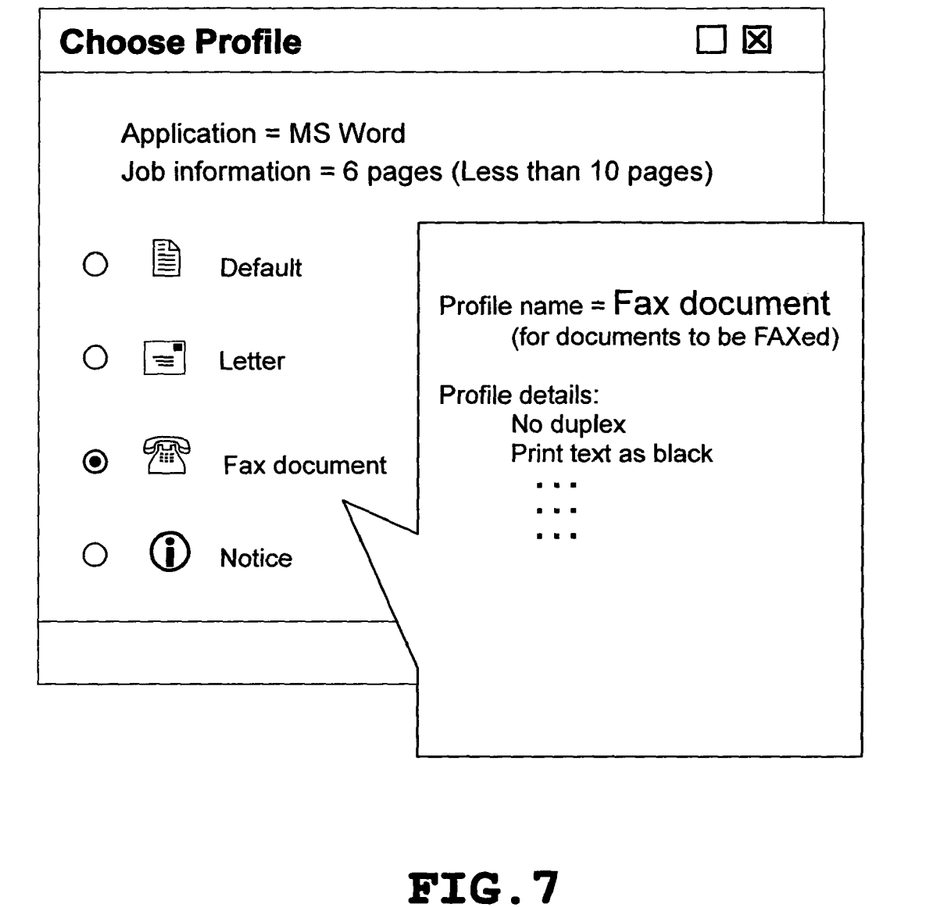
FIG. 7 is a view of the GUI for selecting a profile and displaying profile details, in accordance with a preferred embodiment of the present invention.

FIG. 7 is a view of the GUI for selecting a profile and displaying profile details, in accordance with a preferred embodiment of the present invention. It shows an alternative display method for showing the same information as in FIG. 6. The differences are as follows. Smaller icons are listed vertically instead of horizontally, and accompanied by radio buttons. The selected profile is accompanied by a radio button showing that it has been selected. In an embodiment of the present invention, the profiles details are shown in a balloon-like pop-up menu, which can be activated by a mouse right-click, a keyboard shortcut, or another means. The pop-up menu enables the computer screen from being too cluttered by having detail information that is always shown.

Figure 8:
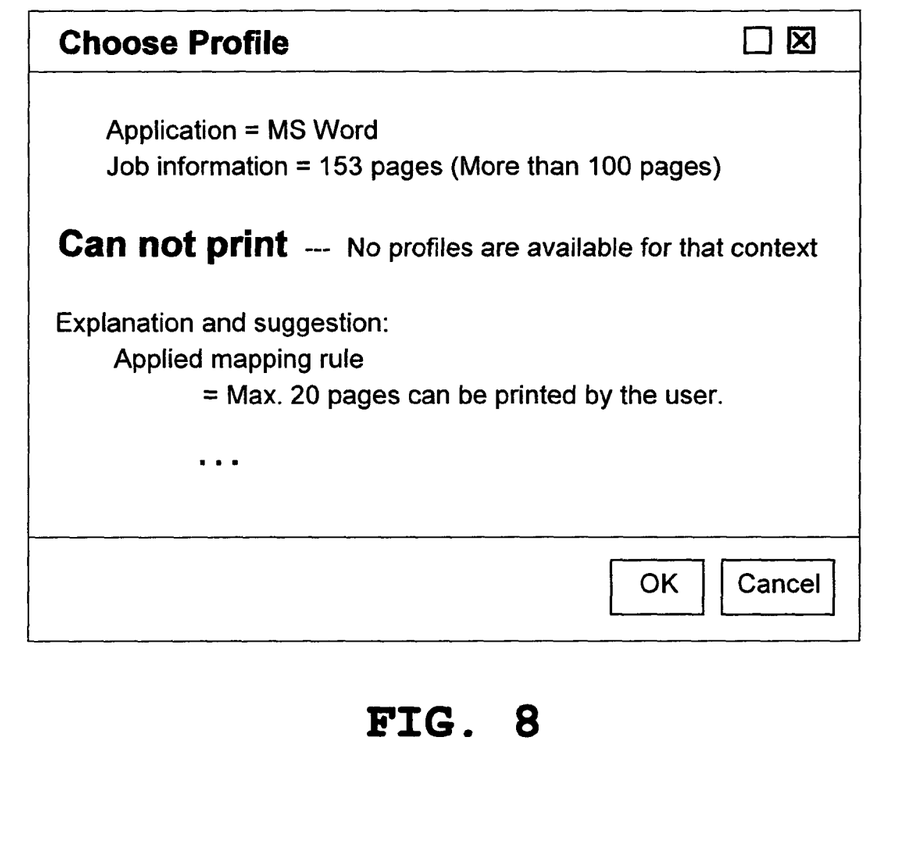
FIG. 8 is a view of the GUI for displaying that the job cannot be printed because there are no available profiles, in accordance with a preferred embodiment of the present invention.

FIG. 8 is a view of the GUI for displaying that the job cannot be printed because there are no available profiles, in accordance with a preferred embodiment of the present invention. When the mapping rules are applied to the current system and job information, the result may be that no profiles are available. In that event, the fact that no profiles are available may be shown prominently with a message "Can not print" or the like, together with some explanation as in the figure or with an icon. In this figure, the applicable current job information of document size (153 pages) is shown, along with classification information (More than 100 pages) which may have been applied. In an embodiment of the present invention, an explanation of applied mapping rule can be displayed in a descriptive format ("Max. 20 pages can be printed by the user.") as well as a suggestion such as duplex printing or 2-up printing may be used to reduce the number of sheets required for printing.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows terminology, one skilled in this art could see how the disclosed methods can be used with other operating systems, such as DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for providing a menu for a device and communicating device setting profile information relating to an operation of the device, wherein device setting profile information comprises information about a set of pre-defined device setting values,
   comprising providing an administrator GUI for an administrator to select and lock-down at least zero device driver setting profiles, and providing a user GUI for displaying to a user the locked-down at least zero profiles and permitting the user to select only from the locked-down at least zero profiles.

2. The method of claim 1, wherein the administrator GUI for an administrator to select and lock-down at least zero profiles further comprises a GUI for the administrator to define a profile comprising: selecting at least one setting value, specifying a profile name and icon, and registering the at least one setting value as a profile.

3. The method of claim 1,
   wherein the administrator GUI for an administrator to select and lock-down at least zero profiles further comprises a GUI for the administrator to define a mapping from system and job information to the at least zero profiles; and
   wherein the user GUI for displaying to the user the locked-down at least zero profiles and permitting the user to select only from the locked-down at least zero profiles comprises obtaining current system and job information, and displaying to the user the locked-down at least zero profiles resulting from applying the mapping from system and job information to the at least zero profiles to the current system and job information.

4. The method of claim 3, wherein the system and job information comprises time and date information, device status information, application information, and user information.

5. The method of claim 3, wherein obtaining of the current system and job information comprises obtaining local information by WMI and remote information by SNMP.

6. The method of claim 3, wherein displaying to the user the locked-down at least zero profiles resulting from applying the mapping from system and job information to the at least zero profiles to the current system and job information comprises: alerting the user when zero profiles result from applying the mapping, and displaying explanation of the mapping and suggestion.

7. The method of claim 1, wherein the user GUI for displaying to a user the locked-down at least zero profiles and permitting the user to select only from the locked-down at least zero profiles further comprises a GUI for selecting a profile and displaying profile detail information in a separate display window.

8. The method of claim 1, wherein the at least zero device driver setting profiles are printer driver setting profiles.

9. A computer program product for providing a menu for a device and communicating device setting profile information relating to an operation of the device, wherein device setting profile information comprises information about a set of pre-defined device setting values,
   comprising machine-readable code for causing a machine to perform the method steps of:
      providing an administrator GUI for an administrator to select and lock-down at least zero device driver setting profiles, and providing a user GUI for displaying to a user the locked-down at least zero profiles and permitting the user to select only from the locked-down at least zero profiles.

10. The computer program product of claim 9, wherein the administrator GUI for an administrator to select and lock-down at least zero profiles further comprises a GUI for the administrator to define a profile comprising:
   selecting at least one setting value, specifying a profile name and icon, and registering the at least one setting value as a profile.

11. The computer program product of claim 9,
   wherein the administrator GUI for an administrator to select and lock-down at least zero profiles further comprises a GUI for the administrator to define a mapping from system and job information to the at least zero profiles; and
   wherein the user GUI for displaying to the user the locked-down at least zero profiles and permitting the user to select only from the locked-down at least zero profiles comprises obtaining current system and job information, and displaying to the user the locked-down at least zero profiles resulting from applying the mapping from system and job information to the at least zero profiles to the current system and job information.

12. The computer program product of claim 11, wherein the system and job information comprises time and date information, device status information, application information, and user information, and wherein obtaining of the current system and job information comprises obtaining local information by WMI and remote information by SNMP.

13. The computer program product of claim 11, wherein displaying to the user the locked-down at least zero profiles resulting from applying the mapping from system and job information to the at least zero profiles to the current system and job information comprises: alerting the user when zero profiles result from applying the mapping, and displaying explanation of the mapping and suggestion.

14. The computer program product of claim 9, wherein the user GUI for displaying to a user the locked-down at least zero profiles and permitting the user to select only from the locked-down at least zero profiles further comprises a GUI for selecting a profile and displaying profile detail information in a separate display window, and wherein the at least zero device driver setting profiles are printer driver setting profiles.

15. A computing system, comprising a device driver programmed to provide a menu for a device and communicating device setting profile information relating to an operation of the device, wherein device setting profile information comprises information about a set of pre-defined device setting values,     comprising providing an administrator GUI for an administrator to select and lock-down at least zero device driver setting profiles, and providing a user GUI for displaying to a user the locked-down at least zero profiles and permitting the user to select only from the locked-down at least zero profiles.

16. The computing system of claim 15, wherein the administrator GUI for an administrator to select and lock-down at least zero profiles further comprises a GUI for the administrator to define a profile comprising: selecting at least one setting value, specifying a profile name and icon, and registering the at least one setting value as a profile.

17. The computing system of claim 15, wherein the administrator GUI for an administrator to select and lock-down at least zero profiles further comprises a GUI for the administrator to define a mapping from system and job information to the at least zero profiles; and     wherein the user GUI for displaying to the user the locked-down at least zero profiles and permitting the user to select only from the locked-down at least zero profiles comprises obtaining current system and job information, and displaying to the user the locked-down at least zero profiles resulting from applying the mapping from system and job information to the at least zero profiles to the current system and job information.

18. The computing system of claim 17, wherein the system and job information comprises time and date information, device status information, application information, and user information, and wherein obtaining of the current system and job information comprises obtaining local information by WMI and remote information by SNMP.

19. The computing system of claim 17, wherein displaying to the user the locked-down at least zero profiles resulting from applying the mapping from system and job information to the at least zero profiles to the current system and job information comprises: alerting the user when zero profiles result from applying the mapping, and displaying explanation of the mapping and suggestion.

20. The computing system of claim 15, further comprising a print engine, wherein the user GUI for displaying to a user the locked-down at least zero profiles and permitting the user to select only from the locked-down at least zero profiles further comprises a GUI for selecting a profile and displaying profile detail information in a separate display window, and wherein the at least zero device driver setting profiles are printer driver setting profiles.

\* \* \* \* \*